(12) United States Patent
Kanungo et al.

(10) Patent No.: US 10,005,294 B1
(45) Date of Patent: Jun. 26, 2018

(54) TWO COMPONENT INK JETTABLE PRIMER AND INCORPORATION OF ADHESION PROMOTER TO THE INK FOR PRINTING ONTO 3D OBJECTS

(71) Applicant: XEROX CORPORATION, Norwalk, CT (US)

(72) Inventors: Mandakini Kanungo, Penfield, NY (US); Jack T. LeStrange, Macedon, NY (US); Peter J. Knausdorf, Henrietta, NY (US); Anthony S. Condello, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days. days.

(21) Appl. No.: 15/457,282

(22) Filed: Mar. 13, 2017

(51) Int. Cl.
*B41J 11/00* (2006.01)

(52) U.S. Cl.
CPC .......... *B41J 11/002* (2013.01); *B41J 11/0015* (2013.01)

(58) Field of Classification Search
None
See application file for complete search history.

(56) References Cited

U.S. PATENT DOCUMENTS

| | | | |
|---|---|---|---|
| 6,210,758 B1* | 4/2001 | McNeil | B05D 7/57 427/409 |
| 8,857,977 B2* | 10/2014 | Grant | B41J 11/0015 347/105 |
| 2002/0061939 A1* | 5/2002 | Cavazos-Gutierrez | B41M 1/34 523/160 |

OTHER PUBLICATIONS

Attached Derwent-ACC-No. 2001-43156 corresponds to the U.S. Pat. No. 6,210,758.*

* cited by examiner

*Primary Examiner* — Lisa M Solomon
(74) *Attorney, Agent, or Firm* — MH2 Technology Law Group LLP

(57) ABSTRACT

Provided is a surface treatment method, including: jetting a first component of a primer composition over a substrate, wherein the first component includes a crosslinking agent; jetting a second component of the primer composition over the substrate, wherein the second component includes a crosslinking activator; and mixing the first component and the second component to form a primer layer, wherein the jetting of the first component and the second component is from at least one printhead.

20 Claims, 2 Drawing Sheets

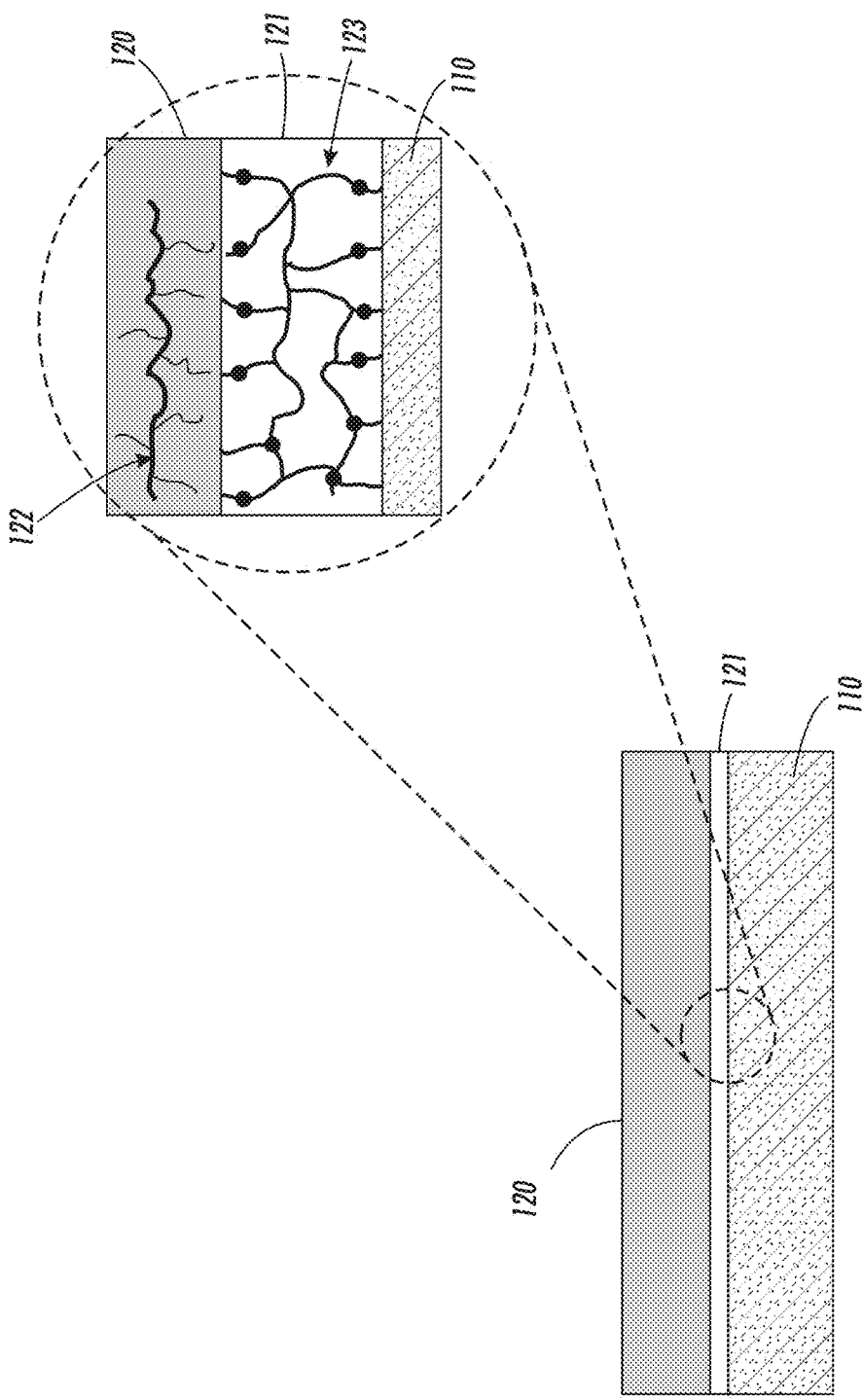

TWO COMPONENT INK JETTABLE PRIMER AND INCORPORATION OF ADHESION PROMOTER TO THE INK FOR PRINTING ONTO 3D OBJECTS

TECHNICAL FIELD

Embodiments described herein relate generally to printing, for example, to aqueous inkjet printers, and, in particular, to surface preparation for aqueous ink inkjet printing, including methods to treat surfaces to ensure good adhesion of inks on different substrates.

BACKGROUND

It is desirable to print images on various substrates. In such applications, the desired image may be formed via ink jet printing. In general, inkjet printing machines or printers include at least one printhead that ejects drops or jets of liquid ink onto a recording or image forming surface of a substrate. An aqueous inkjet printer employs water-based or solvent-based inks in which pigments or other colorants are suspended or in solution. Meanwhile, UV ink-based "object printers" are inkjet printers that are specially designed to print on any object, including three dimensional (3D) objects. These objects can vary widely in form, from their geometries to the materials they are formed from.

Once the aqueous and/or UV-ink is ejected onto an image receiving surface by a printhead, the water or solvent is evaporated to stabilize the ink image on the image receiving surface. The spread of the ink droplets striking the media is a function of the media surface properties and porosity. For example, in some instances, when aqueous ink is ejected directly onto media, the aqueous ink will tend to soak into the media, which may be porous, and change the physical properties of the media. In order to create a smooth, durable image, the object's surface must be ink receptive and the ink must be well adhered to the printing surface or print quality will be inconsistent. To address this issue, either properties of the ink must be modified or properties of the media on which the inks are printed must be modified. For example, adding surfactants to the ink reduces the surface tension of the ink, but such solutions present additional problems including uncontrolled spreading of the ink. This can result in the edges of single pixel lines to be undesirably wavy. Moreover, aqueous printheads have certain minimum surface tension requirements (i.e., greater than 20 mN/m) that must be met for good jetting performance. Alternatively, pretreatment of the object's surface is often required to provide for better wetting and adhesion of the ink. In one option, protective base-layers can be formed on the media by ejecting curable inks onto the media surface and then curing the curable inks, for example, via ultraviolet (UV) radiation for UV curable inks, or via heat for thermally curable inks. The subsequently printed ink droplets may then be printed on the base-layers in a manner that avoids the changes in image quality resulting from the media properties, such as those that occur in response to media contact with the water or solvents in aqueous ink and affect ink drop spread.

As such, the base formed by the cured inks are typically referred to as the image "base layer" or "under-layer" which may comprise one or more layers of white, transparent or colorful inks. Use of these under-layers can be particularly important when printing onto plastics, especially those that are clear or translucent. While the base is necessary in order to achieve desired final image color and overall product appearance to avoid ink-media interactions, one issue that arises with printing onto a UV Ink base or under-layer is the inability of the subsequently color printed image to adequately wet it. Such under layers may also be susceptible to other issues. For example, if the under layer is under-cured, it may offset to any other surface that it comes into contact with (e.g., rollers used in the printer to transport the media). It is also possible that in an under cured state the subsequently printed color ink drops may be enveloped, encapsulated or otherwise distorted by the soft under-cured under-layer(s). Likewise, over-curing of the base ink under-layer may also lead to unacceptable results, such as insufficient wetting of the subsequently printed image color layers.

Yet, while optimization of curing parameters could be relied on to address these problems, other problems may arise. For example, depending on the image being formed, the curing parameters for optimal curing of the base layer may be different from image to image, may vary depending on the different media being printed on or image forming inks being deposited thereon, or may simply not be attainable and risks offsetting as described above when the under-layer(s) contact a surface of the printer. Therefore, optimization of curing parameters to cure the UV inks that form the base under-layers may not be feasible.

Other low-cost, conventional pretreatment methods include those done by hand including buffing, IPA wipe, solvent wipe and drying. More expensive and sometimes automated process options include plasma, corona, blown arc and flame treatment. However, such methods are not optimal for object printing. Accordingly, there is a need for an approach for controlling surface properties that overcome the inefficiencies and expense of conventional methods.

SUMMARY

In an embodiment, there is a surface treatment method, comprising: jetting a first component of a primer composition over a substrate, wherein the first component comprises a crosslinking agent; jetting a second component of the primer composition over the substrate, wherein the second component comprises a crosslinking activator; and mixing the first component and the second component to form a primer layer, wherein the jetting of the first component and the second component is from at least one printhead.

In an embodiment, there is a surface treatment method, comprising: jetting an ink composition over a substrate; jetting an adhesion promoter over the substrate; and mixing the ink composition and the adhesion promoter to form an ink layer, wherein the jetting of the ink composition and the jetting of the adhesion promoter is from at least one printhead.

Advantages can include one or more of the following: automation of surface treatment methods; directional and controllable predetermined patterning of inks; improved primers and primer composition components; delivery of one or more primers and/or inks with one or more printheads; improved adhesion of inks over substrate surfaces; and reduced waste of primer and inks.

Additional advantages of the embodiments will be set forth in part in the description which follows, and in part will be understood from the description, or may be learned by practice of the embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

FIGS. 1A-1B are illustrations of a surface treatment of a substrate surface based on a method of an embodiment, wherein a primer layer and/or ink layer are formed on the surface of a substrate; an inset shows a close-up view of the surface treatment on the substrate.

DESCRIPTION OF THE EMBODIMENTS

Figure 1B:
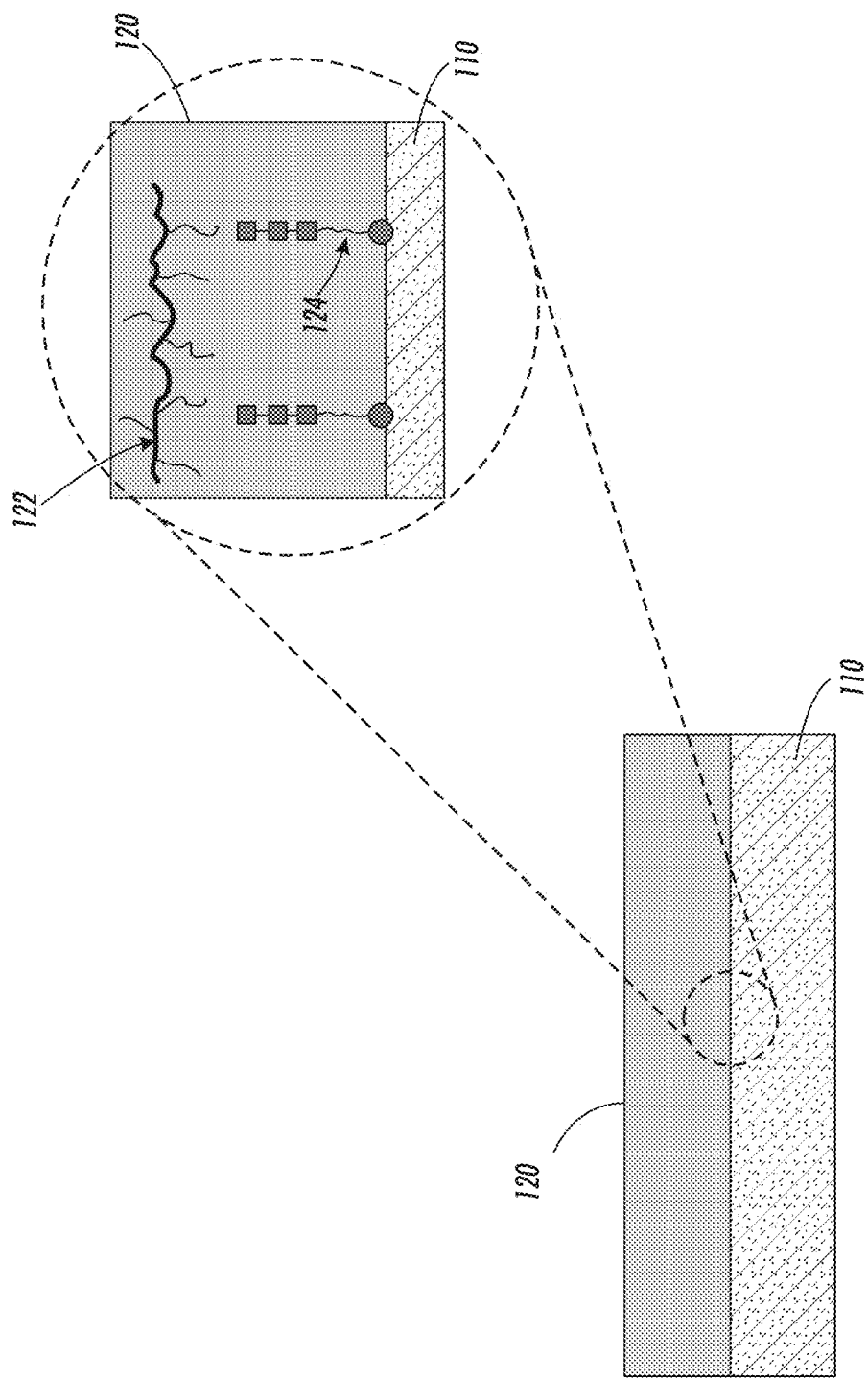

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

As used herein, unless otherwise specified, the word "printer" encompasses any apparatus that performs a print outputting function for any purpose, such as a digital copier, bookmaking machine, facsimile machine, a multi-function machine, electrostatographic device, inkjet printer, etc.

It will be understood that the structures depicted in the figures may include additional features not depicted for simplicity, while depicted structures may be removed or modified.

FIGS. 1A-1B depict a substrate comprising a surface treatment that provides for improved adhesion of a layer of ink 120 to a substrate 110. As described herein, there is a method for improving the adhesion of an ink composition. Such a method can comprise combining an adhesion promoter 124 with an ink composition, forming a layer of ink 120 comprising the ink composition and the adhesion promoter, and/or forming a primer layer (not shown) on a substrate surface and forming an ink layer thereon.

In an embodiment, there is a surface treatment method that may be applied to a substrate, such as substrate 110 in FIG. 1A. The method can include jetting a first component of a primer composition over the substrate 110, wherein the first component comprises a crosslinking agent. The method can include jetting a second component of the primer composition over the substrate 110, wherein the second component comprises a crosslinking activator. The method can include mixing the first component and the second component to form a primer layer 121. An ink composition may then be formed over the primer layer. The ink layer may be cured and/or dried to form ink layer 120. When cured, the primer layer includes primer functional groups 123 that may be bifunctional and allow for bonding between the substrate 110 and ink layer 120.

In an embodiment, there is a surface treatment method that may be applied to a substrate, such as substrate 110 in FIG. 1B. The method can include jetting an ink composition over the substrate; jetting the adhesion promoter 124 over the substrate; and mixing the ink composition and the adhesion promoter to form an ink layer 120, wherein the jetting of the ink composition and the jetting of the adhesion promoter is from at least one printhead. In an embodiment, the jetting of the ink composition and the jetting of the adhesion promoter causes the mixing of the ink composition and the adhesion promoter. For example, the adhesion promoter may be jetted onto the surface of the substrate followed by jetting of the ink composition over and surrounding the adhesion promoter. Alternatively, adhesion promoter may be jetted into a matrix of the ink composition. In another implementation, the adhesion promoter may be a component of the ink composition such that the adhesion promoter, carried in the ink composition, is jetted onto the substrate 110.

Printheads used for jetting the primer components and/or ink compositions can include a plurality of primer components and/or compositions, for example up to about 4 different primer components per printhead. Therefore, in an embodiment the jetting of the first component of the primer and the second component of the primer is from at least one printhead. For example, the at least one printhead comprises a first printhead and a second printhead, wherein the jetting of the first component of the primer is from the first printhead, and wherein the jetting of the second component of the primer is from the second printhead. In an embodiment, the jetting of the first component and the jetting of the second component causes the mixing of the first component and the second component.

In a surface treatment method of the embodiments, at least one ink composition can be jetted over the substrate. For example, the at least one ink composition can be jetted over a primer layer formed by jetting a first component and jetting a second component of a primer composition over the substrate. Alternatively, the at least one ink composition can be deposited directly on the substrate surface.

In some embodiments, multiple primer compositions and/or ink compositions can be used with the at least one printhead, which may be a single printhead or a plurality of printheads. Accordingly, in a surface treatment method of an embodiment, jetting of the at least one ink composition is from the at least one printhead that is used for jetting the first and second components of the primer composition. Thus, the jetting of the at least one ink composition may form an ink layer on the primer layer. In other words, jetting of the at least one ink composition comprises contacting the at least one ink composition with the primer layer.

The at least one ink composition may comprise at least one adhesion promoter. The at least one adhesion promoter may comprise a thermally curable adhesion promoter or an ultraviolet (UV) curable adhesion promoter. Meanwhile, the primer composition can be a thermally curable primer composition or a UV-curable primer composition. Upon curing via heating or exposure to UV radiation, the primer composition may form a cured primer layer that is chemisorbed on a surface of the substrate.

The first component and/or the second component of the primer composition may be made ink-jettable from an ink jet printhead by use of a thinner to control viscosity thereof. Accordingly, in an embodiment the first component of the primer composition, the second component of the primer composition, or both, further comprise denatured alcohol.

The primer composition and/or the adhesion promoter of the ink composition may be individually selected for suitability with a substrate material. For example, the substrate may comprise metal, rubber, plastic, paper, glass, fabric, or combinations thereof. For example, the substrate may comprise a three-dimensional (3D) printed object.

The at least one printhead may be configured for depositing material (e.g., via inkjet jetting) imagewise over a surface of the substrate in order to form a pattern thereon. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form patterns of primer compositions and/or ink, for example, ink images, on an image receiving surface. Some printer embodiments include a plurality of printheads arranged in a print zone. An image receiving surface, such as a substrate of whatever suitable form, including sheets of material or three-dimensional (3D) objects, moves past the printheads in a process direction through the print zone and/or the printhead can be configured to move around a static substrate. The inkjets in the printheads eject ink-jettable material, such as primer compositions or ink compositions of the embodiments in the form of jetted drops in rows, for example, in a cross-process direction, which is perpendicular to the process direction across the image receiving surface.

A printhead with current designs may be configured to have four ink inlets, one for each color (e.g., cyan, magenta, yellow, and black in a CMYK color model), and corresponding nozzles. Such printheads may be used for jetting the first component and the second component of the primer composition and inkjet ink compositions, as described above, via one or more jetting nozzles. The jetting nozzles may be disposed proximate the substrate.

In embodiments, jetting nozzles from at least one first printhead and at least one second printheads, disposed proximate the substrate, can be configured for depositing material (e.g., via inkjet jetting) imagewise over a surface of the substrate in order to form a pattern, such as an image, thereon.

The at least one printhead may comprise printhead modules. The printhead modules can be operatively connected to the printer's frame and aligned to eject the first component of the primer composition, the second component of the primer composition, and ink-jettable inks in an imagewise pattern on the surface of the substrate. The associated printhead modules for the at least one printhead can include corresponding electronics, reservoirs, and conduits to supply primer and/or ink compositions to the at least one printheads. For example, conduits can operatively connect a source to the at least one printhead to provide a supply of at least one primer and a supply of ink to the one or more printheads. Each of the at least one printheads can be the same kind of printhead used for depositing ink, such as inkjet printheads.

At least one inkjet printhead is capable of jetting the primer compositions and/or the ink compositions described herein. In an embodiment, the primer composition can be deposited on a substrate using the inkjet printhead with a resolution of 150 dpi in a single pass, or as low as, for example, 75 dpi and over multiple passes. In an embodiment, the at least one inkjet printhead delivers at least one primer composition over select surface portions of a substrate rather than flooding the entire surface thereof.

The addition of primer(s) and/or adhesion promoter(s) on a substrate surface may appear as an organic layer at an interface between substrate and an ink composition formed thereover. The layer comprising the primer and/or adhesion promoter may be bifunctional and bond well to both the substrate and layers formed thereover, such as inks, adhesives and/or sealants. Both primers and adhesion promoters of embodiments may be adsorbed onto the surface of a substrate. In embodiments, such adsorption is of a strength that the adsorption is irreversible. Accordingly, both primers and adhesion promoters of the embodiments bay me chemisorbed to the surface of a substrate.

The use of a primer helps to prepare the substrate as a good base for better wetting and adhesion of subsequently deposited ink compositions to the substrate. The primer composition of the embodiments may be a one-component primer or a two-component primer. For example, the primer composition may include a first component (i.e., component A) and a second component (i.e., component B). In an example, the first component comprises a reactive component, such as a crosslinking agent. In an example, the second component comprises a reaction activating component, such as a crosslinking activator. When the first and second components are mixed to form a primer composition, and optionally, further exposed to increased temperature or ultraviolet radiation, a polymerization chemical reaction occurs. The polymerization reaction continues after the primer composition has been applied to the surface of a substrate and after a solvent thereof, for example, denatured alcohol, has evaporated to produce a densely cross linked film which can be very hard and has good solvent and chemical resistance. In an implementation, the primer composition may be a two-component primer of polyol and polyisocyanate, or a one-component primer selected from the group consisting of acrylics, urethanes, acryl-urethanes, and vinyls. In an implementation, the primer composition may be a two-component isocyanate crosslinking systems (polyurethanes) or based on a two-component epoxy systems (epoxy resins).

Examples of suitable two component primers of the embodiments include, but are not limited to, PETIT PAINT 6455/044 metal primer available Kop-Coat, Inc. (d/b/a Kop-Coat Marine Group of Rockaway, N.J.), NANO UV PRIMERS® available from Sun 3D Corporation (Pompano Beach, Fla.), two component acrylic primers such as COSMO SP-830.110 manufactured by Weiss Chemie+Technik GmbH & Co. (Haiger, Germany), two component transparent UV Curable primer such as MARA® Shield UV- PGL. The primer composition of the embodiments may be a hydrophilic polyurethane coating composition in a liquid carrier.

In some embodiments, the substrate surface on which the primer composition is deposited can be treated with, for example, corona, to create functional groups on the surface to help in binding the primer to the surface.

The primer composition may be heat-cured, or UV cured. For example, during the jetting of the primer composition, the various components are mixed together along with, for example, a thinner (solvent) to create a thin layer of primer composition over the surface of the substrate. In the case of a thermally cured primer composition, the thin layer may be exposed to increased temperatures (e.g., through a heat chamber or dried with a hot-air gun) to evaporate the solvent, thereby leaving a thin primer layer chemisorbed to the surface of the substrate. In the case of a UB-curable primer composition, solvent may be evaporated off and the thin layer of primer composition can be exposed to UV-radiation (e.g., a curing lamp) to cure and cross-link of the primer.

Examples of crosslinking agent include a trialkoxy- or trihydroxysilane terminated polydialkylsiloxane crosslinker, for example, tetraethoxysilane (TEOS), a trialkoxysilane terminated polydialkylsiloxane and/or one or more of a trialkoxysilyl terminated polymer.

The crosslinking activator may be a crosslinking promoter or a catalyst. Examples of crosslinking activators include a polyisocyanate activator which may be modified with an epoxy-functional silane.

The ink compositions of the embodiments may be any suitable ink composition. Examples of ink compositions suitable for use herein include those having characteristics that render them capable of being jetted from an inkjet printer. In an embodiment, at least one ink composition of at least one embodiment may comprise an ultraviolet (UV) curable ink, for example, an ultraviolet-curable aqueous ink. As used in this document, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant.

In an embodiment, the UV curable ink composition may comprise a black colorant, a magenta colorant, a cyan colorant, a yellow colorant, a white colorant or combinations thereof. In an embodiment, the UV curable ink may comprise a transparent UV curable ink.

As described above, the adhesion promoter may be incorporated as part of an ink composition. Adhesion promoters which can be incorporated into the ink composition can improve adhesion of various paint systems to various substrates by generating chemical bonds between a binder of the ink composition and the substrate over which the ink composition is formed. The adhesion promoters may include anchor portions that comprise reactive groups, for example, to covalently bond to a substrate surface, thereby increasing adhesion of the ink composition in which the adhesion promoter is mixed according to methods herein. Opposite the anchor portions may be other reactive, functional groups, to bond with other components of the ink. The anchor portion and the reactive, functional groups may be separated by a polymeric backbone.

Exemplary adhesion promoters include organosilane coupling agents can improve adhesion of inkjet inks to substrates such as glass, silica, alumina or active metals. The adhesion promoter, therefore, may comprise a coupling agent. In an example, the adhesion promoter comprises a silane based adhesion promoter. In an example, the silane based adhesion promoter includes an alkoxy silane or halo silane. The alkoxy silane may be represented by $RCH_2CH_2CH_2Si(OCH_3)_3$ where R is an active chemical group such as amino ($NH_2$), mercapto (SH) or isocyano (NCO). The halo silane may comprise chlorosilane. Suitable adhesion promoters include those available from BYK-Chemie GmbH of Wesel, Germany, such as BYK-4500, BYK-4509, BYK-4510, BYK-4511, BYK-4512 and BYK-4513.

In some embodiments, the substrate surface on which the ink composition is deposited can be treated with, for example, corona, to create functional groups on the surface to help in binding the adhesion promoter to the surface. In embodiments, the adhesion promoter is adsorbed to the surface of the substrate. In embodiments, the adhesion promoter is chemisorbed to the surface.

In an example, the binder for the ink composition can include at least one multi-functional monomer. In an embodiment, the at least one multi-functional monomer comprises a multi-vinyl monomer having from at least about 2 to about 5 vinyl moieties. Examples of suitable multi-functional monomers include monomers selected from the group consisting of pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris(2-hydroxy ethyl)isocyanurate triacrylate, trifunctional acrylate ester, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, and mixtures and combinations thereof. The binder or ink vehicle for the ink composition can also include monomer compounds such as acrylate, methacrylate, alkene, vinyl ether, allylic ether, and mixtures and combinations thereof. Specific examples of monomers include isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, styrene, isoprene, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate, and mixtures and combinations thereof. Further, the binder may include tricyclodecane dimethanol diacrylate, lauryl diacrylate, 1,4-butanediol-diacrylate, 1,3-butylene glycol diacrylate, trimethylolpropane triacrylate, ethoxylated lauryl acrylate, polyethylene glycol diacrylate, glyceryl triacrylate, triacrylate, and mixtures and combinations thereof.

In an embodiment, the ultraviolet-curable aqueous ink may comprise an ultraviolet polymerizable compound. The ultraviolet polymerizable compound may be exemplified with a compound having a polymerizable group that is radically polymerized by UV rays, and may be a monomer, an oligomer, or a mixture thereof. As the polymerizable group, a group having an ethylenically unsaturated double bond may be exemplified, and specific examples thereof may include an acryloyl group, a methacryloyl group, a vinyl group, a vinyl ether group, a maleic anhydride group, and an N-substituted maleimide group. The ultraviolet polymerizable compound may be used either alone or in combination of two or more kinds thereof.

The ultraviolet polymerizable compound may be a water-soluble ultraviolet polymerizable compound or a water-insoluble ultraviolet polymerizable compound. In an example of the ultraviolet polymerizable compound, "water-soluble" means that an object material is dissolved in an amount of 5 parts by mass or more (preferably, 10 parts by mass or more) based on 100 parts by mass of water at 25° C. In an example of the ultraviolet polymerizable compound, "water-insoluble" means that an object material is dissolved in an amount of less than 5 parts by mass based on 100 parts by mass of water at 25° C.

The ultraviolet polymerizable compound may comprise a water-soluble ultraviolet polymerizable compound. The water-soluble ultraviolet polymerizable compound may comprise a conventionally known UV polymerizable compound. In an embodiment, the water-soluble ultraviolet polymerizable compound may include radical polymerizable monomers such as acryloyl morpholine (ACMO), hydroxyethyl acrylamide (HEAA), diacetone acrylamide, N-vinyl-2-pyrrolidone, N-vinyl-formamide, vinyl naphthalene sulfonic acid, hydroxyethyl(meth)acrylate, methoxypolyethylene glycolmethacrylate, methoxy polyethylene glycolacrylate, ester of succinic anhydride and 2-hydroxyethyl(meth)acrylate, ester of orthophthalic anhydride and 2-hydroxyethyl(meth)acrylate, and combinations thereof. In an embodiment, the water-soluble ultraviolet polymerizable compound may include a water-soluble ultraviolet polymerizable monomer such as (meth)acrylate ester of polyhydric alcohol, and (meth)acrylate ester of glycidyl ether derived from polyhydric alcohol.

As the water-insoluble ultraviolet polymerizable compound, a conventionally known water-insoluble ultraviolet polymerizable substance may be exemplified, and specific examples of the water-insoluble ultraviolet polymerizable substance may include radical polymerizable monomers such as alcohols, acrylate esters of polyhydric alcohols or amino alcohols; methacrylate esters of alcohols or polyhydric alcohols; acrylic aliphatic amides; acrylic alicyclic amides; and acrylic aromatic amides.

The ultraviolet polymerizable compound may comprise a water-soluble ultraviolet polymerizable compound. The water-insoluble ultraviolet polymerizable compound may comprise oligomers obtained by polymerizing water-insoluble ultraviolet polymerizable monomers to a required degree of polymerization. For example, the water-insoluble ultraviolet polymerizable compound may comprise oligomers of acrylate (e.g., epoxy acrylate, urethane acrylate, polyester acrylate, polyether acrylate, urethane methacrylate, and polyester methacrylate) having an acryloyl group or a methacryloyl group on an epoxy skeleton, a urethane skeleton, a polyester skeleton or a polyether skeleton. In an embodiment, the water-insoluble ultraviolet polymerizable compound is emulsified and dispersed in an aqueous ink by a conventionally known method. The water-insoluble ultraviolet polymerizable material may be a self-emulsified or emulsified by a dispersant.

The ultraviolet-curable aqueous ink may further comprise one or more of an ultraviolet polymerization initiator. For example, the one or more ultraviolet polymerization initiator may include a water-soluble ultraviolet polymerization initiator or a water-insoluble ultraviolet polymerization initiator. In an embodiment, the ultraviolet polymerization initiator may include a water-insoluble thioxanthone compound. Specific examples of the thioxanthone compound may include isopropyl thioxanthone, diethyl thioxanthone, chlorothioxanthone, dimethyl thioxanthone, methylethyl xanthone, and methyl isopropyl xanthone. The ultraviolet polymerization initiator may be used in combination with other ultraviolet polymerization initiators in addition to or other than the thioxanthone compound. For example, the ultraviolet polymerization initiator may comprise one or more water-soluble ultraviolet polymerization initiators including conventionally known ultraviolet polymerization initiators such as hydroxyacetophenones (e.g., 1-phenyl-2-hydroxy-2-methyl-1-propanone, 1-hydroxy-cyclohexyl-phenyl-ketone, 1-[4-(2-hydroxyethoxy)-phenyl]-2-hydroxy-2-methyl-1-propanone), aminoacetophenones (e.g., 2-methyl-1-(4-methylthiophenyl)-2-morpholinopropane-1-one, 2-benzyl-2-dimethyl amino-1-(4-morpholinophenyl)-butane-1-one), thioxanthone ammonium salts, and benzophenone ammonium salts. Examples of other water-insoluble ultraviolet polymerization initiator may include conventionally known ultraviolet polymerization initiators such as a benzoin compound (e.g., benzoin ethylether, benzoin isopropyl ether), benzophenone, an acylphosphine oxide compound (bis(2,4,6-trimethylbenzoyl)-phenylphosphine oxide, bis(2,6-dimethoxybenzoyl)-2,4,4-trimethylpentyl phosphine oxide, 2,4,6-trimethylbenzoylphenyl ethoxyphosphine oxide, 2,4,6-trimethylbenzoyl diphenylphosphine oxide), and an anthraquinone compound (e.g., ethyl anthraquinone). Other water-insoluble ultraviolet polymerization initiator may be emulsified and dispersed in an aqueous ink by a conventionally known method using a dispersant, etc., or may be dissolved or dispersed by a water-soluble organic solvent and dispersed in an ink.

The ultraviolet-curable aqueous ink may further comprise a hydrogen donor agent (i.e., an ultraviolet polymerization auxiliary initiator). As the hydrogen donor agent, a water-insoluble tertiary amine compound may be employed. For example, the water-insoluble tertiary amine compound may include 2-dimethylamino ethyl benzoate, 4-dimethylamino ethyl benzoate, 4-dimethylamino isoamyl benzoate, 4-dimethylamino methyl benzoate, 4-dimethylamino 3-methylbutyl benzoate, 4-dimethylamino 2-ethylhexyl benzoate, p-piperidinyl methyl benzoate, p-piperidinyl ethyl benzoate, p-piperazinyl methyl benzoate, p-piperazinyl ethyl benzoate, p-morpholino methyl benzoate, p-morpholino ethyl benzoate, 4-diethylamino methyl benzoate, 4-diethylamino 3-methylbutyl benzoate, 2-diethylamino ethyl benzoate, 4-diethylamino ethyl benzoate, 4-diethylamino isoamyl benzoate, tripropylamine, tributylamine, dimethylphenyl piperazine, 1-(2-ethoxyphenylpiperazine, and 1-(2,6-dimethoxyphenyl) piperazine and combinations thereof. The hydrogen donor agent (ultraviolet polymerization auxiliary initiator) may be used in combination with other hydrogen donor agents besides the water-insoluble tertiary amine compound. Examples of other hydrogen donor agents may include conventionally known hydrogen donor agents such as amine-containing compounds such as aliphatic amine, amine (piperidine) containing an aromatic group, and triethanolamine; urea-containing compounds such as allylurea, and o-tolylthiourea; sulfur-containing compounds such as sodium diethyldithiophosphate, and a soluble salt of aromatic sulfinic acid; a nitrile-containing compound such as N,N,di-substituted p amino benzonitrile; phosphorous-containing compounds such as tri-n-butylphosphine, sodium diethyl dithiophosphate; nitrogen-containing compounds such as Michler's ketone, N-nitrosohydroxyl amine derivatives, oxazolidine compounds, tetrahydro-1,3-oxazin compounds, and condensates of aldehyde (formaldehyde or acetaldehyde) and diamine; a polymerized amine constituted by a reaction product of an epoxy resin and amine; and triethanolamine triacrylate.

The ultraviolet-curable aqueous ink may further include water. The water may comprise ion-exchanged water, ultra-pure water, distilled water, or ultrafiltration water may be appropriately exemplified, especially, from the standpoint of suppressing impurities from being mixed, or microorganisms from being produced.

The ultraviolet-curable aqueous ink may further include a water-soluble organic solvent. Examples of other water-soluble organic solvent may include polyhydric alcohols, polyhydric alcohol derivatives, a nitrogen-containing solvent, alcohols, and a sulfur-containing solvent. Further examples of the water-soluble organic solvent may include propylene carbonate, and ethylene carbonate. Examples of the polyhydric alcohols may include sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose. Examples of the polyhydric alcohol derivatives may include ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adduct of diglycerin. The water-soluble organic solvent may be used either alone or in combination of two or more kinds thereof. The content of the water-soluble organic solvent may preferably range from 1 mass % to 60 mass %, and more preferably from 1 mass % to 40 mass %, based on the water.

As described above, at least one ink of at least on embodiment may be white, transparent or may comprise a color. In an example, an ink composition may include a coloring agent, for example, a pigment. In an embodiment, the UV-curable material may comprise a black pigment, at least one of a primary color pigments including cyan, magenta, and/or yellow, specific color pigments such as red, green, blue, brown, and white, metallic luster pigments such as gold and silver, colorless pigments, or combinations thereof. Pigment, particles may be obtained by fixing a dye or a pigment onto the surface of silica, alumina, or polymer beads as a core, and/or may include an insoluble lake product of a dye, a colored emulsion, and a colored latex.

Specific examples of a black pigment may include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, and Raven 1060 (all manufactured by Columbian Carbon Co., Ltd), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corporation), Color Black FW1, Color Black FW2, Color Black FW2V, Color Black 18, Color Black FW200, Color Black 5150, Color Black S160, Color Black 5170, Printex35, Printex U, Printex V, Printex 140U, Printex 140V, Special Black 6, Special Black 5, Special Black 4A, and Special Black 4 (all manufactured by DEGUSSA Corporation), and No. 25, No. 33, No. 40, No. 47, No. 52, No. 900, No. 2300, MCF-88, MA600, MA7, MA8, and MA100 (all manufactured by Mitsubishi Chemical Corporation), but the embodiments described herein are not limited thereto. Specific examples of a cyan color pigment may include C.I. Pigment Blue-1, -2, -3, -15, -15:1, -15:2, -15:3, -15:4, -16, -22, and -60, but the embodiments described herein are not limited thereto. Specific examples of a magenta color pigment may include C.I. Pigment Red-5, -7, -12, -48, -48:1, -57, -112, -122, -123, -146, -168, -177, -184, -202, and C.I. Pigment Violet-19, but the embodiments described herein are not limited thereto. Specific examples of a yellow pigment may include C.T. Pigment Yellow-1, -2, -3, -12, -13, -14, -16, -17, -73, -74, -75, -83, -93, -95, -97, -98, -114, -128, -129, -138, -151, -154, and -180, but the embodiments described herein are not limited thereto. In an embodiment, when the pigment is used as the coloring agent, a pigment dispersant is preferably used together with the pigment. Examples of the pigment dispersant that may be used may include a polymer dispersant, an anionic surfactant, a cationic surfactant, an amphoteric surfactant, and a nonionic surfactant.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A surface treatment method, comprising:
jetting a first component of a primer composition over a substrate, wherein the first component comprises a crosslinking agent;
jetting a second component of the primer composition over the substrate, wherein the second component comprises a crosslinking activator; and
mixing the first component and the second component to form a primer layer, wherein the primer layer comprises an uncured primer layer, and
wherein the jetting of the first component and the second component is from at least one printhead.

2. The method of claim 1, wherein the jetting of the first component and the jetting of the second component causes the mixing of the first component and the second component.

3. The method of claim 1, wherein the at least one printhead comprises a first printhead and a second printhead, wherein the jetting of the first component is from the first printhead, and wherein the jetting of the second component is from the second printhead.

4. The method of claim 1, further comprising jetting at least one ink composition over the substrate.

5. The method of claim 4, wherein the jetting of the at least one ink composition is from the at least one printhead.

6. The method of claim 4, wherein the at least one ink composition comprises at least one adhesion promoter.

7. The method of claim 6, wherein the at least one adhesion promoter comprises a thermally curable adhesion promoter.

8. The method of claim 6, wherein the at least one adhesion promoter comprises an ultraviolet (UV) curable adhesion promoter.

9. The method of claim 4, wherein the jetting of the at least one ink composition forms an ink layer on the primer layer.

10. The method of claim 4, wherein the jetting of the at least one ink composition comprises contacting the at least one ink composition with the primer layer.

11. The method of claim 1, wherein the primer layer comprises a thermally curable primer layer.

12. The method of claim 1, wherein the primer layer comprises an ultraviolet (UV) curable primer layer.

13. A surface treatment method, comprising:
jetting a first component of a primer composition over a substrate, wherein the first component comprises a crosslinking agent;
jetting a second component of the primer composition over the substrate, wherein the second component comprises a crosslinking activator; and
mixing the first component and the second component to form a primer layer, wherein the jetting of the first component and the second component is from at least one printhead, and
wherein the first component, the second component or both further comprises denatured alcohol.

14. The method of claim 1, wherein the primer layer is chemisorbed on a surface of the substrate.

15. The method of claim 1, further comprising curing the primer layer to form a cured primer layer.

16. The method of claim 1, wherein the substrate comprises one or more of metal, rubber, plastic, paper, glass or fabric.

17. A surface treatment method, comprising:
jetting a first component of a primer composition over a substrate, wherein the first component comprises a crosslinking agent;
jetting a second component of the primer composition over the substrate, wherein the second component comprises a crosslinking activator; and
mixing the first component and the second component to form a primer layer,
wherein the jetting of the first component and the second component is from at least one printhead, and
wherein the substrate comprises a three-dimensional (3D) printed object.

18. The method of claim 1, wherein the substrate comprises a three-dimensional (3D) printed object.

19. The method of claim 1, wherein the first component, the second component, or both further comprises denatured alcohol.

20. The method of claim 13, wherein the jetting of the first component and the jetting of the second component causes the mixing of the first component and the second component.

* * * * *